(12) United States Patent
Snyder et al.

(10) Patent No.: US 11,827,820 B2
(45) Date of Patent: Nov. 28, 2023

(54) APPLICATOR NOZZLES

(71) Applicant: Transportation IP Holdings, LLC, Norwalk, CT (US)

(72) Inventors: Robert J. Snyder, Shawnee, KS (US); Manuel L Flores, Erie, PA (US)

(73) Assignee: Transportation IP Holdings, LLC

( * ) Notice: Subject to any disclaimer, the term of this patent is extended or adjusted under 35 U.S.C. 154(b) by 67 days.

(21) Appl. No.: 17/014,347

(22) Filed: Sep. 8, 2020

(65) Prior Publication Data
US 2021/0079267 A1   Mar. 18, 2021

Related U.S. Application Data

(60) Provisional application No. 62/899,659, filed on Sep. 12, 2019.

(51) Int. Cl.
| | |
|---|---|
| *B05C 5/02* | (2006.01) |
| *C09J 5/00* | (2006.01) |
| *B05D 1/26* | (2006.01) |

(52) U.S. Cl.
CPC ............... *C09J 5/00* (2013.01); *B05C 5/0254* (2013.01); *B05D 1/26* (2013.01)

(58) Field of Classification Search
CPC .......................... B05C 17/0052; E04F 21/165
See application file for complete search history.

(56) References Cited

U.S. PATENT DOCUMENTS

| | | | | |
|---|---|---|---|---|
| 2,862,543 | A * | 12/1958 | Kaminsky | B29C 66/1142 156/308.6 |
| 3,559,234 | A * | 2/1971 | Swayze | B05C 17/00516 425/317 |
| 3,627,534 | A * | 12/1971 | Hendershot | G03C 1/4853 430/592 |
| 4,074,655 | A * | 2/1978 | Gross | B05C 17/00516 118/410 |
| 4,824,270 | A * | 4/1989 | Clarke | B05C 17/00596 401/266 |

FOREIGN PATENT DOCUMENTS

WO    WO 2014/015855 A2 *  1/2014

OTHER PUBLICATIONS

English translation of WO 2014/015855A2.*

* cited by examiner

*Primary Examiner* — Charles Capozzi
(74) *Attorney, Agent, or Firm* — THE SMALL PATENT LAW GROUP LLC; Philip S. Hof

(57) ABSTRACT

A slot applicator nozzle has a body with a dispensing end sized to fit within a slot of an object. The body defines a channel therethrough with an outlet at the dispensing end. The dispensing end includes a leading contact surface and a trailing contact surface separated from each other by a gap. Both the leading and trailing contact surfaces are configured to contact a bottom surface of the slot as the body is moved along the slot in an application direction. The trailing contact surface is disposed between the leading contact surface and a rear end of the body. The outlet of the channel is configured to emit a flowable substance rearward of the trailing contact surface onto the bottom surface of the slot as the body is moved in the application direction.

16 Claims, 8 Drawing Sheets

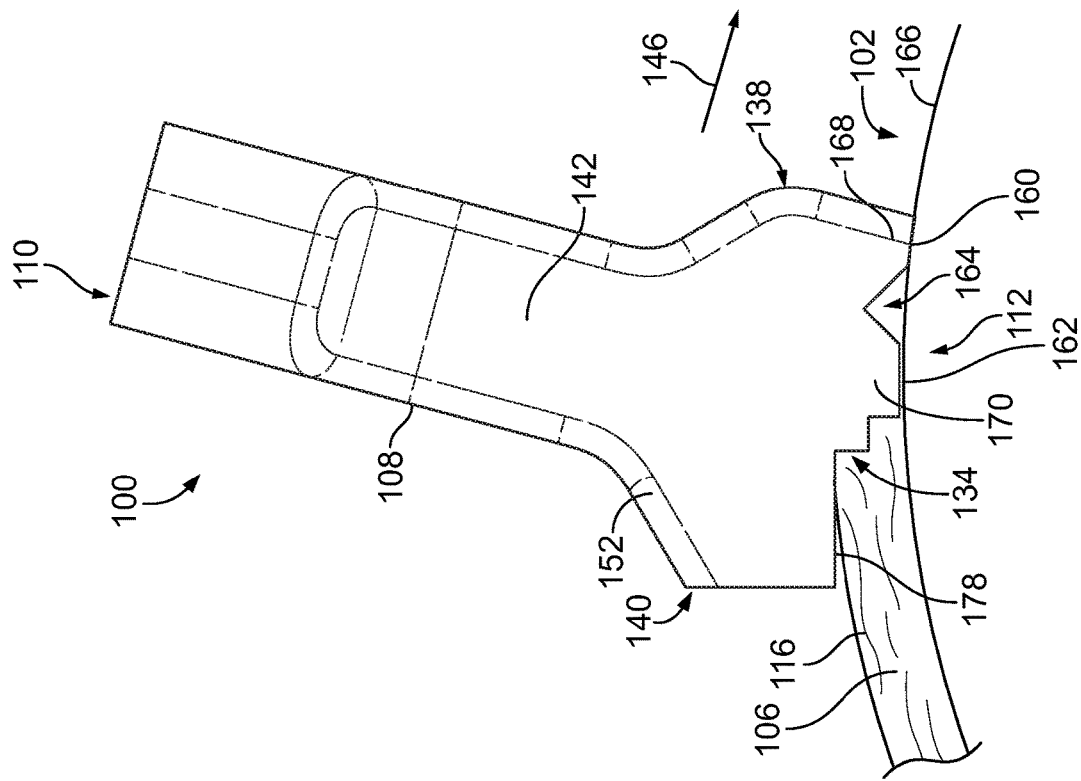
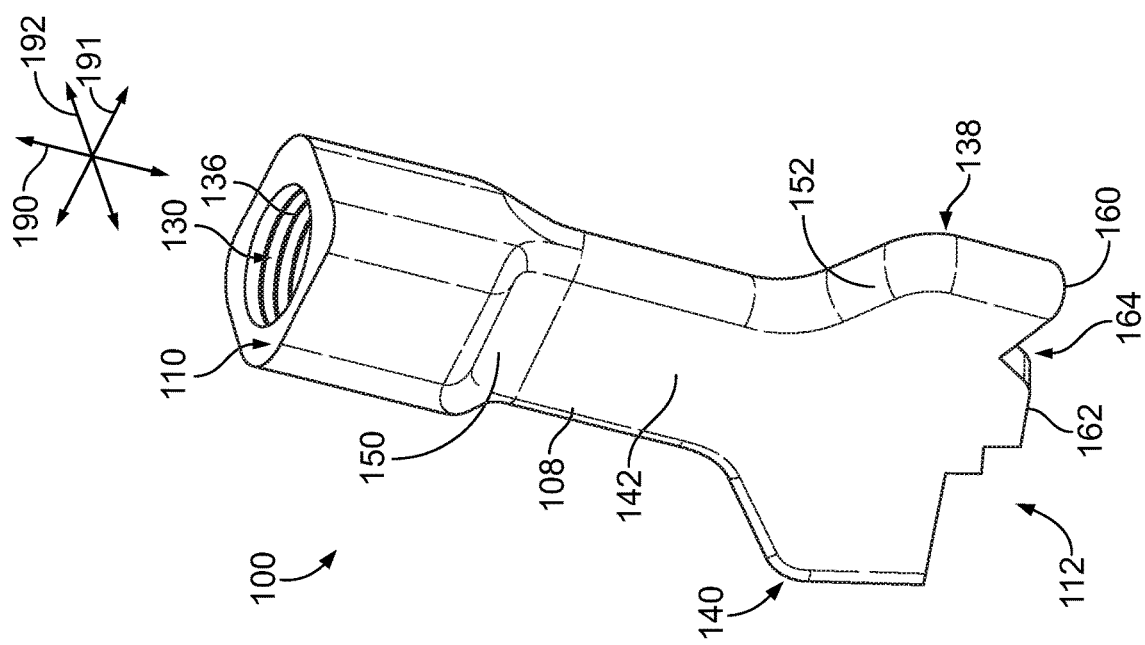

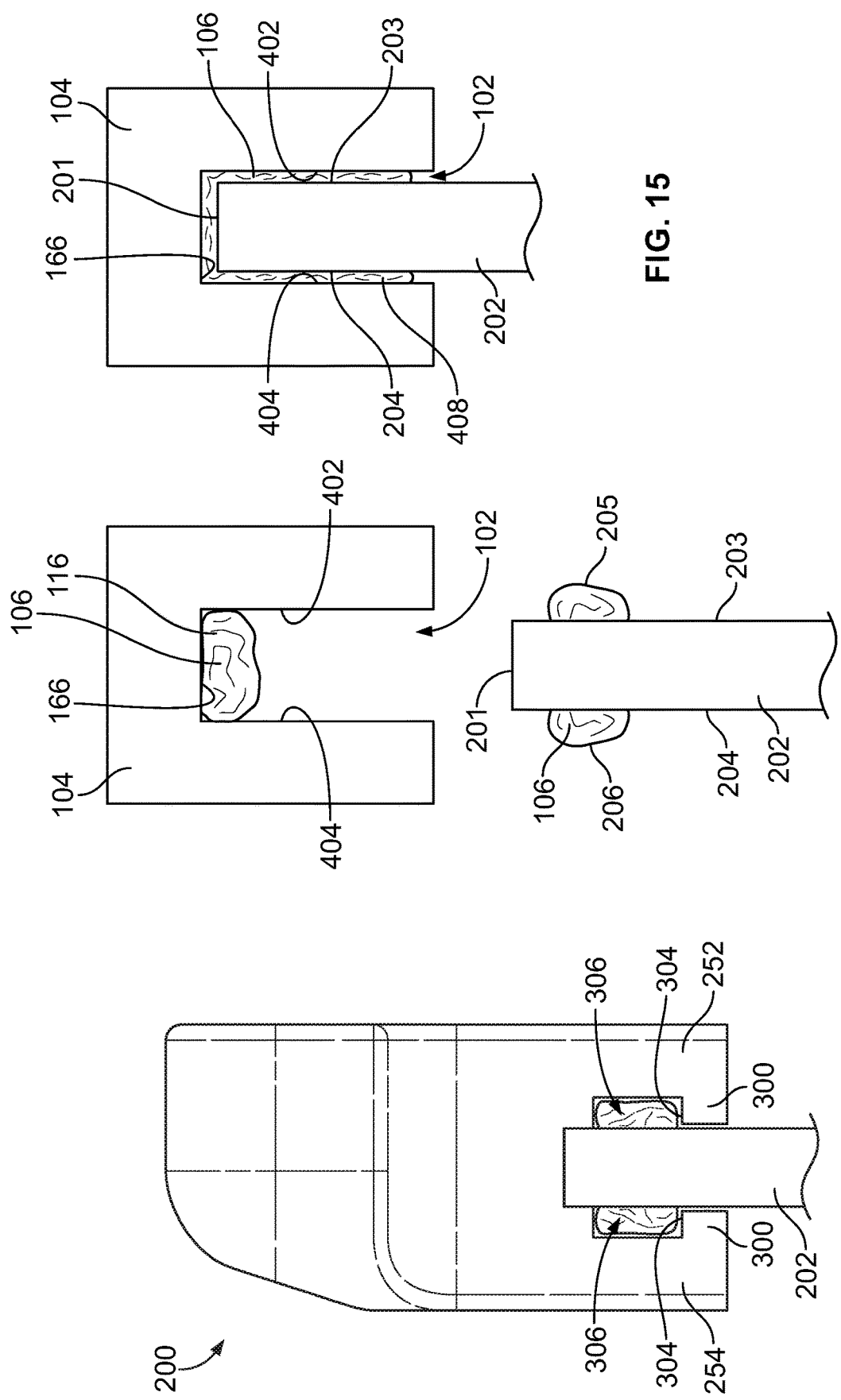

APPLICATOR NOZZLES

CROSS-REFERENCE TO RELATED APPLICATIONS

This application relates to and claims priority benefits from U.S. Provisional Application No. 62/899,659, entitled "Applicator Nozzles," filed 12 Sep. 2019, which is incorporated herein by reference in its entirety.

FIELD

Embodiments of the subject matter described herein relate to applicator nozzles for dispensing a flowable substance.

BACKGROUND

Flowable substances, such as sealants and adhesives, are applied at the interfaces between separate objects. During an assembly process to seal an interface between a panel and a slot of another object, an applicator nozzle may be used to apply a bead of a flowable substance along one or both of the panel or the slot. Some known applicator nozzles do not provide a desired amount of accuracy and control over the placement locations of the beads, the amount of substance forming the beads, or the shape and uniformity of the beads. The variations in the substance application may have unintended consequences, such as the formation of leak paths through the sealed interface and/or increased costs due to excessive consumption of flowable substance, necessitated touch-ups or other maintenance, or the like.

BRIEF DESCRIPTION

In an embodiment, a slot applicator nozzle is provided that includes a body with a dispensing end sized to fit within a slot of an object. The dispensing end extends from a front end of the body to a rear end of the body. The body defines a channel therethrough with an outlet at the dispensing end. The dispensing end includes a leading contact surface and a trailing contact surface separated from each other by a gap. Both the leading and trailing contact surfaces are configured to contact a bottom surface of the slot as the body is moved along the slot in an application direction. The trailing contact surface is disposed between the leading contact surface and the rear end. The outlet of the channel is configured to emit a flowable substance rearward of the trailing contact surface onto the bottom surface of the slot as the body is moved in the application direction.

In an embodiment, a method of applying a flowable substance to a slot is provided. The method includes inserting a dispensing end of a slot applicator nozzle into a slot of an object. The dispensing end includes a leading contact surface and a trailing contact surface separated from each other by a gap and configured to contact a bottom surface of the slot. The method includes applying, via the slot applicator nozzle, a flowable substance to the slot. The slot applicator nozzle includes a body that defines a channel therethrough with an outlet at the dispensing end. The applying includes moving the body along the slot in an application direction. The trailing contact surface is disposed behind the leading contact surface relative to the application direction. The outlet emits the flowable substance rearward of the trailing contact surface onto the bottom surface of the slot as the body is moved in the application direction.

In an embodiment, a panel applicator nozzle is provided that includes a body with a dispensing end and a mounting end. The dispensing end defines a nozzle guide slot disposed between a first arm and a second arm of the body. The nozzle guide slot has a base surface shaped to engage an edge of a panel while the first and second arms straddle the panel. The body defines an inlet at the mounting end and one or more passageways fluidly connected to the inlet. The one or more passageways extend to a first outlet along an inner surface of the first arm and to a second outlet along an inner surface of the second arm. The inner surfaces of the first and second arms face toward each other. The body is configured to receive a flowable substance through the inlet and dispense the flowable substance from the first and second outlets onto opposite first and second sides, respectively, of the panel.

In an embodiment, a slot applicator nozzle is provided that includes a body with a mounting end and a dispensing end opposite the mounting end. The dispending end is sized to fit within a slot of an object. The dispensing end extends from a front end of the body to a rear end of the body. The body defines a channel therethrough with an outlet at the dispensing end. The dispensing end includes a leading contact surface and a trailing contact surface separated from each other by a gap. Both the leading and trailing contact surfaces are configured to contact a bottom surface of the slot as the body is moved along the slot in an application direction. The trailing contact surface is disposed between the leading contact surface and the rear end. The outlet of the channel is configured to emit a flowable substance rearward of the trailing contact surface onto the bottom surface of the slot as the body is moved in the application direction. The leading contact surface is recessed relative to the trailing contact surface along a height of the body such that, when both the leading contact surface and the trailing contact surface are in contact with the bottom surface of the slot, the body leans such that the mounting end leads the dispensing end as the body is moved in the application direction. The dispensing end also includes a leveling surface disposed rearward of the trailing contact surface and the outlet. The leveling surface is recessed a distance from the trailing contact surface along the height of the body for controlling a height of a bead of the flowable substance deposited onto the bottom surface as the body moves.

BRIEF DESCRIPTION OF THE DRAWINGS

The inventive subject matter will be better understood from reading the following description of non-limiting embodiments, with reference to the attached drawings, wherein below:

FIG. 3 is a top perspective view of the slot applicator nozzle according to an embodiment;

FIG. 4 is a side view of the slot applicator nozzle shown in FIG. 3;

FIG. 13 is a side view of the applicator nozzle according to an alternative embodiment;

FIG. 14 illustrates a panel poised for insertion into a slot of an object according to an embodiment;

FIG. 15 illustrates the panel of FIG. 14 within the slot of the object; and

DETAILED DESCRIPTION

Embodiments of the present disclosure relate to applicator nozzles for dispensing flowable substances, such as sealants, onto working surfaces of objects. The present disclosure describes an applicator nozzle for dispensing a bead of a substance or compound within a slot (e.g., a channel, groove, or other narrow, elongate aperture) of an object. The present disclosure also describes an applicator nozzle for dispensing one or more beads of the substance or compound onto a panel (e.g., a flange or other member having opposite sides adjacent to an edge of the member) adjacent to an edge thereof. The panel is then configured to be inserted into the slot such that the beads fill clearance space within the slot. The substance or compound dispensed by the applicator nozzles described herein may be a sealant, an adhesive, or the like. Non-limiting example sealants include room temperature vulcanizing (RTV) compounds, such as silicone rubber RTV compounds. The applicator nozzles described herein may be used to provide beads of compound onto two different complementary members that are subsequently assembled together to form a sealed joint.

Figure 1:
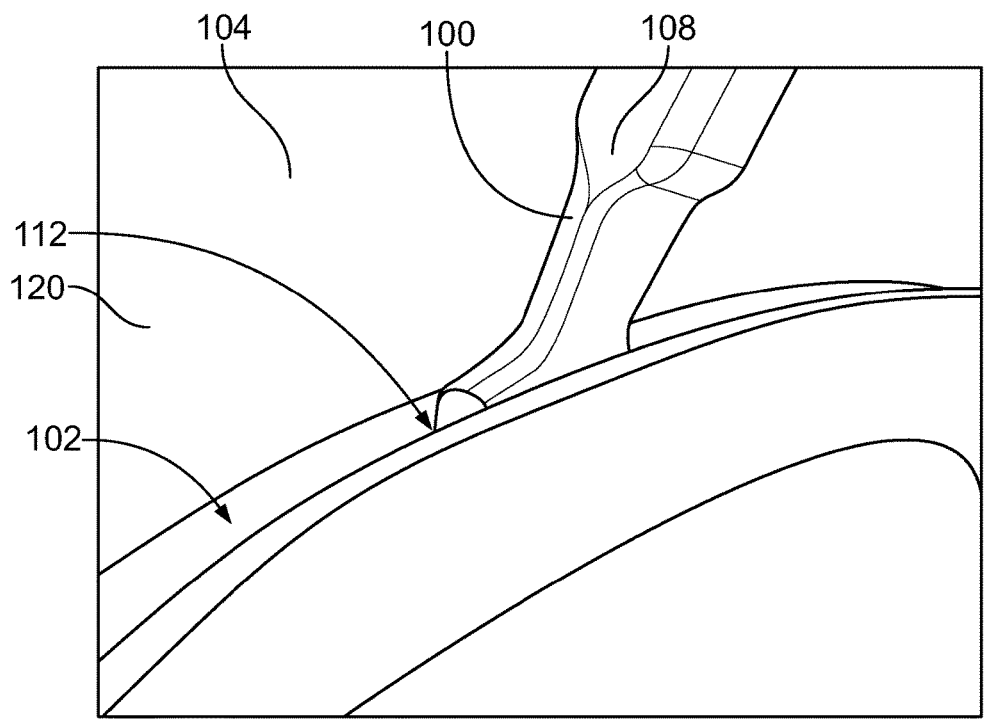
FIG. 1 is a first perspective view of a slot applicator nozzle according to an embodiment extending at least partially into a slot of an object.
Figure 2:
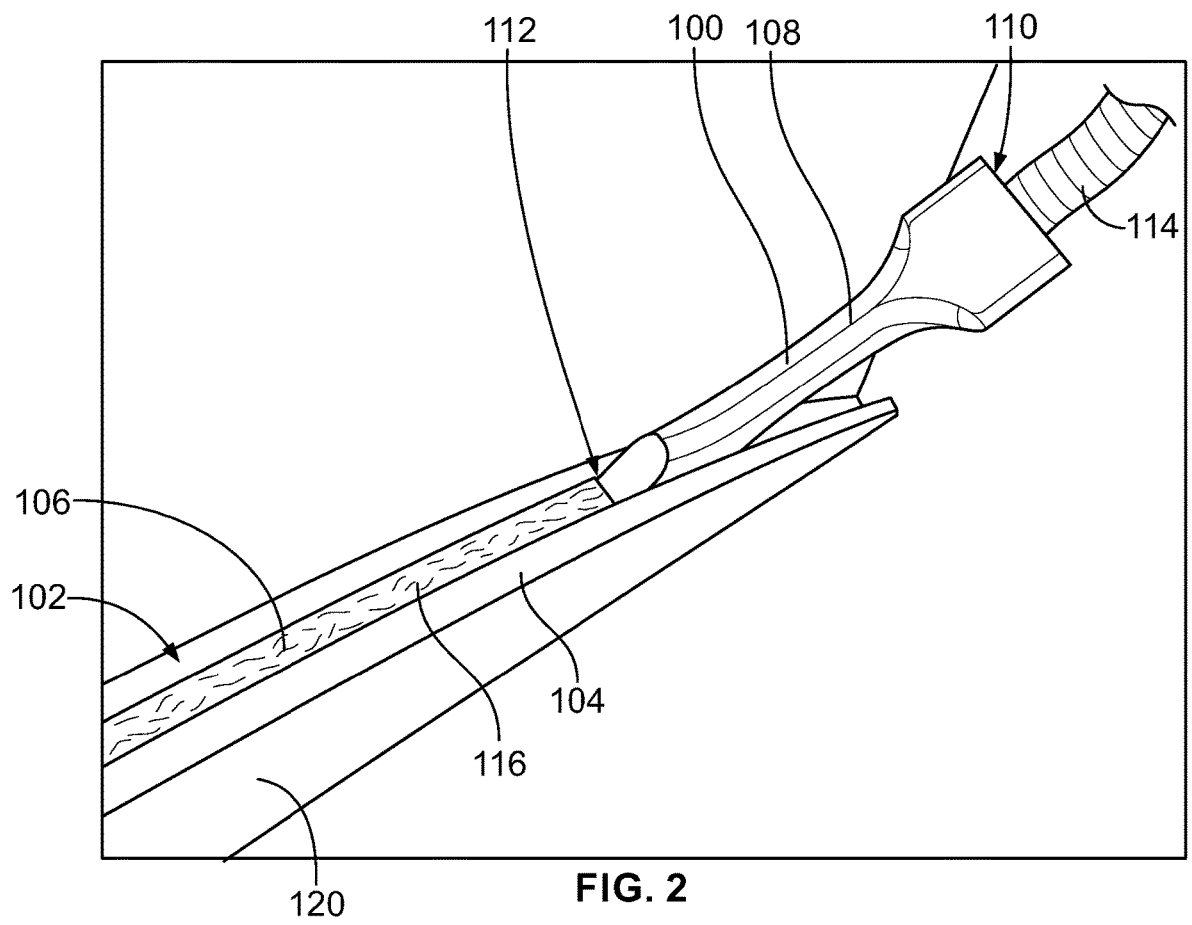
FIG. 2 is a second perspective view of the slot applicator nozzle of FIG. 1 extending into the slot of the object.

FIG. 1 is a first perspective view of a slot applicator nozzle 100 according to an embodiment with the nozzle extending at least partially into a slot 102 of an object 104. FIG. 2 is a second perspective view of the slot applicator nozzle 100 of FIG. 1 extending into the slot 102 of the object 104. The slot applicator nozzle 100 (also referred to herein as applicator nozzle 100) is used to dispense a flowable substance 106 into the slot 102 of the object 104. The applicator nozzle 100 has a body 108 including a mounting end 110 and a dispensing end 112. The slot applicator nozzle 100 conveys the flowable substance 106 through the body 108 and emits the substance 106 at the dispensing end 112. The dispensing end 112 is sized and shaped to fit within narrow spaces, such as the slot 102. For example, the dispensing end 112 is thinner and/or flatter than the mounting end 110. In the illustrated embodiment, the applicator nozzle 100 receives the substance 106 from a hose or tube 114 that is connected to the mounting end 110.

The applicator nozzle 100, as described herein, is designed to be moved along a length of the slot 102 while dispensing a bead 116 of the substance 106 which forms a trail behind the applicator nozzle 100. The applicator nozzle 100 accurately controls the location, shape, amount, and uniformity of the bead 116 that is dispensed into the slot 102. In one or more embodiments, the flowable substance 106 is a sealant, such as an RTV silicone compound, and the substance 106 is referred to herein as sealant 106. But, applicator nozzle 100 described herein is not limited to dispensing sealants, and may be used to dispense other types of flowable materials and substances, such as adhesives.

In the illustrated embodiment shown in FIGS. 1 and 2, the object 104 that defines the slot 102 is a seal 120 for a gear case assembly. The seal 120 is configured to annularly extend between an axle (or shaft) and an axle bore of the gear case assembly. An edge of the axle bore is configured to be inserted into the slot 102, and the sealant 106 seals around the edge of the axle bore to provide a sealed interface. The seal 120 may block oil leaks and the transmission of other substances and debris into and out of the gear case assembly. The applicator nozzle 100 described herein may be used in applications other than sealing gear case assemblies, such as various vehicular, industrial, and even residential uses for dispensing a controlled amount and placement of a flowable substance into a slot.

Figure 7:
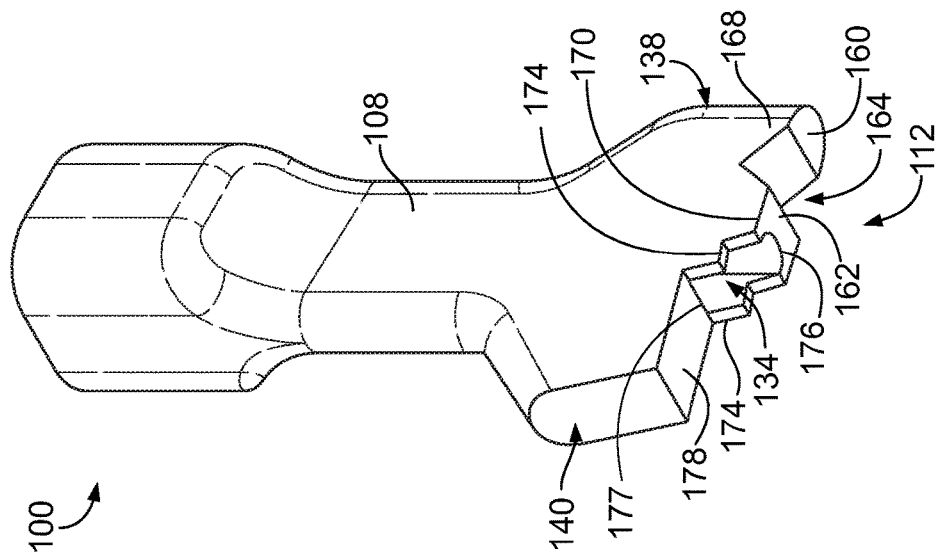
FIG. 7 is a bottom perspective view of the slot applicator nozzle shown in FIG. 3.
Figure 6:
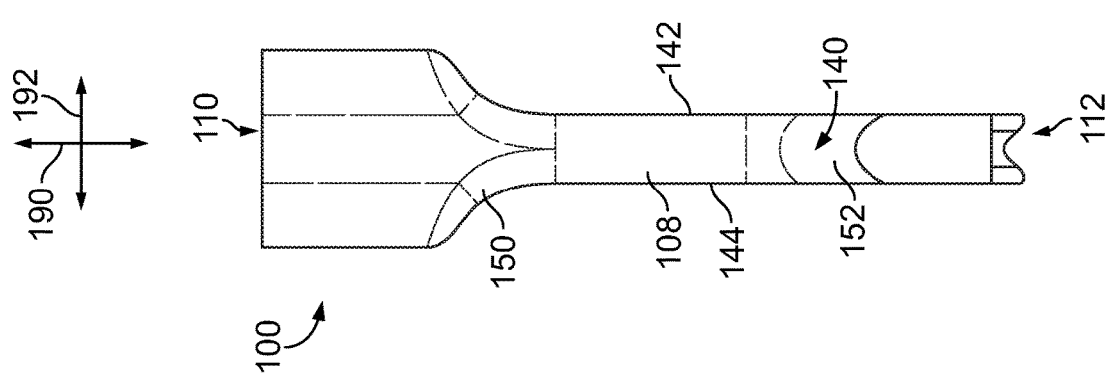
FIG. 6 is an end view of the slot applicator nozzle shown in FIG. 3.
Figure 5:
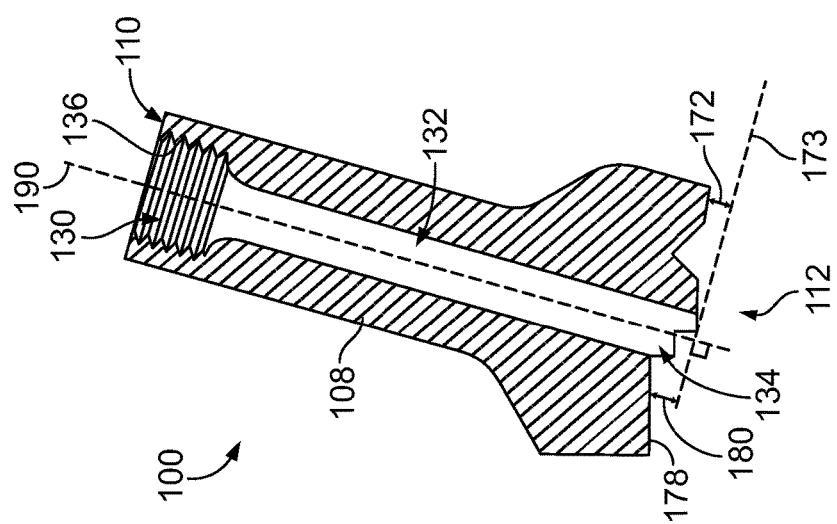
FIG. 5 is a cross-sectional side view of the slot applicator nozzle shown in FIG. 3.

FIGS. 3 through 7 illustrate various views of the slot applicator nozzle 100 shown in FIGS. 1 and 2. For example, FIG. 3 is a top perspective view of the applicator nozzle 100. FIG. 4 is a side view of the applicator nozzle 100. FIG. 5 is a cross-sectional side view of the applicator nozzle 100. FIG. 6 is an end view of the applicator nozzle 100. FIG. 7 is a bottom perspective view of the applicator nozzle 100.

With reference to FIGS. 3 through 5, the body 108 of the applicator nozzle 100 extends a height or length along a longitudinal axis 190 from the mounting end 110 to the dispensing end 112 such that the mounting end 110 is opposite the dispensing end 112 in the illustrated embodiment. The mounting end 110 defines an inlet 130 or opening to a channel 132. The body 108 defines the channel 132 therethrough. The channel 132 extends from the inlet 130 to an outlet 134 at the dispensing end 112. The sealant 106 enters the channel 132 through the inlet 130 and exits through the outlet 134. As shown in FIG. 5, the channel 132 may define a straight path through the body 108. Alternatively, the path of the channel 132 may bend or curve along the height of the body 108. The body 108 may include internal helical threads 136 along the channel 132 at the inlet 130 for releasably coupling to complementary threads of the hose or tube 114, shown in FIG. 2, which supplies the sealant 106 to the applicator nozzle 100. In an alternative embodiment, the helical threads may be along an exterior of the body 108, outside of the channel 132. In another alternative embodiment, another type of coupling mechanism may be used instead of helical threads, such as a bayonet coupling. Optionally, the mounting end 110 may not be opposite the dispensing end 112, such as if the body 108 defines a curved or right-angle channel 132.

Referring now to FIGS. 3, 4, and 6, the body 108 has a width along a lateral axis 191 from a front end 138 to a rear end 140, and a depth along a depth axis 192 from a first side 142 to a second side 144. The second side 144 is opposite the first side 142 and is not visible in FIGS. 3 and 4. The longitudinal axis 190, lateral axis 191, and depth axis 192 can be mutually perpendicular. The front end 138 and the rear end 140 are designated based on a designed application direction 146 of the applicator nozzle 100. For example, as shown in FIG. 4, the applicator nozzle 100 is configured to be moved in the application direction 146 within the slot 102 relative to the object 104 (shown in FIG. 2). The front end 138 faces the application direction 146, and the rear end 140 faces in the opposite direction.

In the illustrated embodiment, the body 108 is contoured such that the mounting end 108 has a greater thickness along the depth axis 192 (between the first and second sides 142, 144) than the dispensing end 112 and a narrower width along the lateral axis 191 (between the front and rear ends 138, 140) than the dispensing end 112. For example, the body 108 includes a tapered segment 150 and a flared segment 152 spaced apart along the height of the body 108. The flared segment 152 is disposed between the tapered segment 150 and the dispensing end 112. The contoured shape of the body 108 may provide an ergonomic handle for an operator holding the applicator nozzle 100 by hand.

Referring now to FIGS. 4, 5, and 7, the dispensing end 112 includes a leading contact surface 160 and a trailing contact surface 162 separated from each other by a gap 164. The leading contact surface 160 is located closer to the front end 138 than the trailing contact surface 162 (e.g., the trailing contact surface 162 is between the leading contact surface 160 and the rear end 140). The leading contact surface 160 is in front of the trailing contact surface 162 as the applicator nozzle 100 moves in the application direction 146. Both the leading and trailing contact surfaces 160, 162 are configured to contact a bottom surface 166 of the slot 102. For example, the contact surfaces 160, 162 may slide in sustained engagement with the bottom surface 166 as the applicator nozzle 100 moves along the length of the slot 102. The leading contact surface 160 is part of a leading foot 168 (e.g., protrusion), and the trailing contact surface 162 is part of a trailing foot 170. The contact surfaces 160, 162 are separated from each other along the width by the gap 164 for stability. For example, having two spaced apart locations of contact with the bottom surface 166 of the slot 102 may reduce the likelihood of the applicator nozzle 100 rocking or tilting away from the designated orientation shown in FIG. 4 as the nozzle 100 is moved along the slot 102, which may disrupt the uniformity and accuracy of the sealant 106 application.

The leading contact surface 160 may be recessed relative to the trailing contact surface 162 along the height (e.g., longitudinal axis 190) of the body 108. For example, as shown in FIG. 5, the leading contact surface 160 is offset by a short distance 172 from a line 173 that extends from the trailing contact surface 162 perpendicular to the longitudinal axis 190. The offset is provided such that, when both the leading contact surface 160 and the trailing contact surface 162 engage in physical contact with the bottom surface 166 of the slot 102, the body 108 leans in the application direction 146. For example, the mounting end 110 is disposed in front of (e.g., leads) the dispensing end 112 in the application direction 146. The body 108 in one embodiment is designed to have a leaning pose in the designated position of the applicator nozzle 100 for comfort and ergonomic purposes. The leaning pose may support the ability and ease at which an operator can drag the applicator nozzle 100 through the slot 102 in the application direction 146.

In one or more embodiments, the object 104 (shown in FIG. 2) is cylindrical and the slot 102 of the object 104 extends along a circumference of the object 104. As a result, the bottom surface 166 of the slot 102 may be curved, as shown in FIG. 4. The orientations and/or positions of the leading and trailing contact surfaces 160, 162 may be complementary to the curvature of the bottom surface 166. For example, the leading contact surface 160 and the trailing contact surface 162 may be angled relative to each other to complement the curved bottom surface 166 and provide stability, as described above. For larger diameter objects 104, the orientations of the two contact surfaces 160, 162 may be closer to each other (e.g., closer to parallel) than if the nozzle 100 is designed for a smaller diameter object 104. In an alternative embodiment, the leading contact surface 160 and the trailing contact surface 162 are coplanar.

The outlet 134 of the channel 132 is configured to emit the sealant 106 rearward of the trailing contact surface 162 onto the bottom surface 166 of the slot 102 as the body 108 is moved in the application direction 146. The result is a bead 116 of sealant 106 that trails the nozzle 100 on the bottom surface 166 of the slot 102. The applicator nozzle 100 is configured to control the application for providing consistent placement, size, and shape of the bead 116 along the entire path of the nozzle 100 within the slot 102. For example, the applicator nozzle 100 may apply a continuous bead 116 (without gaps) having a substantially uniform height.

In an embodiment, the dispensing end 112 also includes a leveling surface 178 disposed rearward of the trailing contact surface 162 along the width. The trailing contact surface 162 is between the leveling surface 178 and the leading contact surface 160. The leveling surface 178 is configured to control a dimension and/or shape of the bead 116 of sealant 106 deposited onto the bottom surface 166 as the body 108 moves. In one embodiment, the leveling surface 178 is recessed a designated distance 180 from the trailing contact surface 162 along the height of the body 108. In a non-limiting example, the designated distance 180 is no less than 0.05 inches and no greater than 0.6 inches. The leveling surface 178 provides a relatively level bead 116 that has a height or thickness from the bottom surface 166 no greater than the designated distance 180. For example, the designated distance 180 may be specifically designed to yield a 0.25 inch bead 116 of sealant 106. The leveling surface 178 in the illustrated embodiment is planar, but the leveling surface 178 optionally may be concave or arch-shaped in an alternative embodiment to provide a more rounded bead 116.

The outlet 134 of the channel 132 is located between the trailing contact surface 162 and the leveling surface 178 along the dispensing end 112. For example, as shown in FIGS. 5 and 7, part of the channel 132 may extend through the trailing leg 170, and the outlet 134 is along a rear edge of the trailing leg 170 immediately behind the trailing contact surface 162. The outlet 134 may have an orientation that is transverse to the trailing contact surface 162 to emit the bead 116 rearward of the trailing contact surface 162. Optionally, a portion of the outlet 134 may be defined along the leveling surface 178. For example, the outlet 134 may be stepped such that a front edge 176 of the outlet 134 is defined by the trailing contact surface 162 and a rear edge 177 of the outlet 134 is defined by the leveling surface 178, which is recessed relative to the trailing contact surface 162. Side edges of the outlet 134 that extend from the front edge to the rear edge are transverse to the trailing contact surface 162. The side edges are defined by side walls 174 of the body 108. The side walls 174 may control the width of the bead that is dispensed into the slot. The side walls 174 are shown as having an angular stepped or zig-zag shape in the illustrated embodiment, but the side walls 174 can have other shapes in other embodiments. For example, the side walls 174 may extend linearly from the trailing contact surface 162 to the leveling surface 178 or may have a concave curved shape extending from the trailing contact surface 162 to the leveling surface 178. The portion of the leveling surface 178 rearward of the outlet 134 controls the shape of the bead 116. In an alternative embodiment, the entire outlet 134 may be disposed along the leveling surface 178 and spaced apart from the rear end 140 by a portion of the leveling surface 178.

Figure 8:
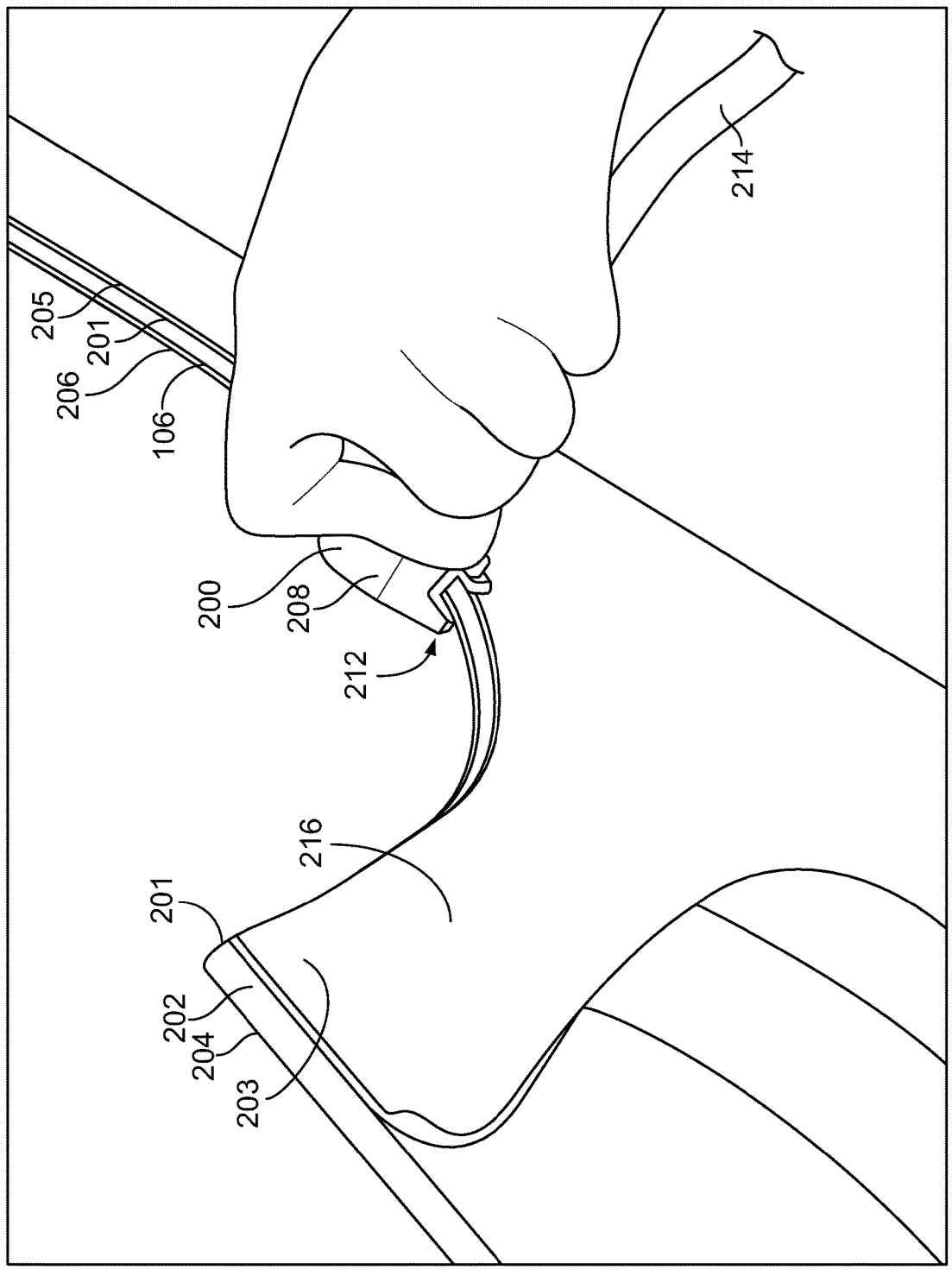
FIG. 8 is a perspective view of a panel applicator nozzle according to an embodiment straddling an edge of a panel.

FIG. 8 is a perspective view of a panel applicator nozzle 200 according to an embodiment straddling an edge 201 of a panel 202. The panel applicator nozzle 200 (also referred to herein as applicator nozzle 200) is used to dispense the sealant 106 or other flowable substance onto both a first side 203 and an opposite second side 204 of the panel 202 at or proximate to the edge 201. For example, the first side 203 and the second side 204 extend from opposite corners of the edge 201. The applicator nozzle 200 is designed with the ability to concurrently dispense a first bead 205 of the sealant 106 onto the first side 203 and a second bead 206 of the sealant 106 onto the second side 204. The beads 205, 206 are disposed proximate to the edge 201. In an embodiment, the applicator nozzle 200 does not dispense the sealant 106 directly onto the edge 201, as described in more detail herein.

The applicator nozzle 200 has a body 208 including a mounting end 210 (shown in FIG. 9) and a dispensing end 212. The applicator nozzle 200 receives the sealant 106 from a hose or tube 214 connected to the mounting end 210, conveys the sealant 106 through the body 208, and emits the sealant 106 at the dispensing end 212. The dispensing end 212 is designed to straddle the edge 201 of the panel 202 and to be moved along a length of the edge 201. The beads 205, 206 form respective trails behind the nozzle 200. The applicator nozzle 200 specifically and accurately controls the location, size, and uniformity of the beads 205, 206 deposited onto the panel 202.

In the illustrated embodiment shown in FIG. 8, the panel 202 is an axle bore 216 of a gear case assembly. After applying the sealant 106 to the axle bore 216, the edge 201 of the axle bore 216 may be configured to be received into the slot 102 of the seal 120 (shown in FIGS. 1 and 2) to provide a sealed interface. The applicator nozzle 200 described herein may be used in applications other than gear case assemblies, such as various other vehicular, industrial, and even residential uses for dispensing a controlled amount and placement of a flowable substance onto opposite sides of a panel.

Figure 10:
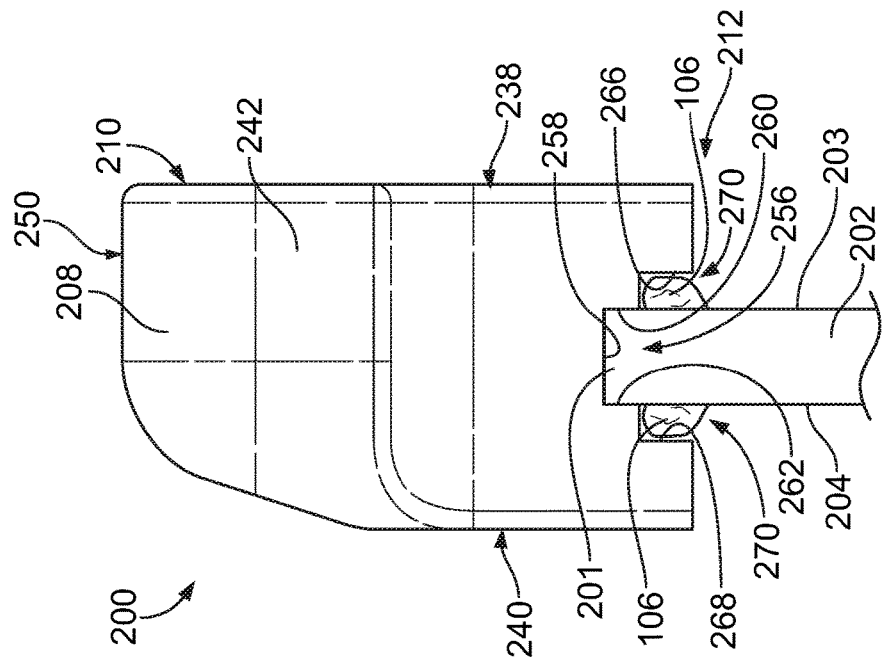
FIG. 10 is a side view of the panel applicator nozzle shown in FIG. 9.
Figure 9:
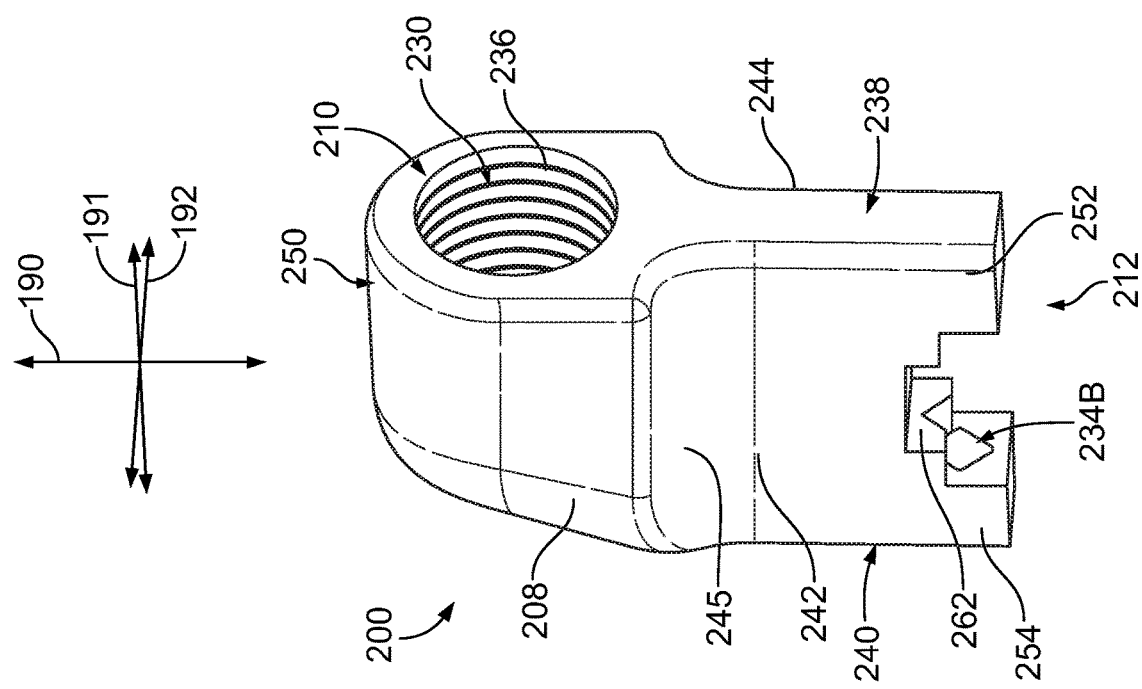
FIG. 9 is a top perspective view of the panel applicator nozzle according to an embodiment.
Figure 12:
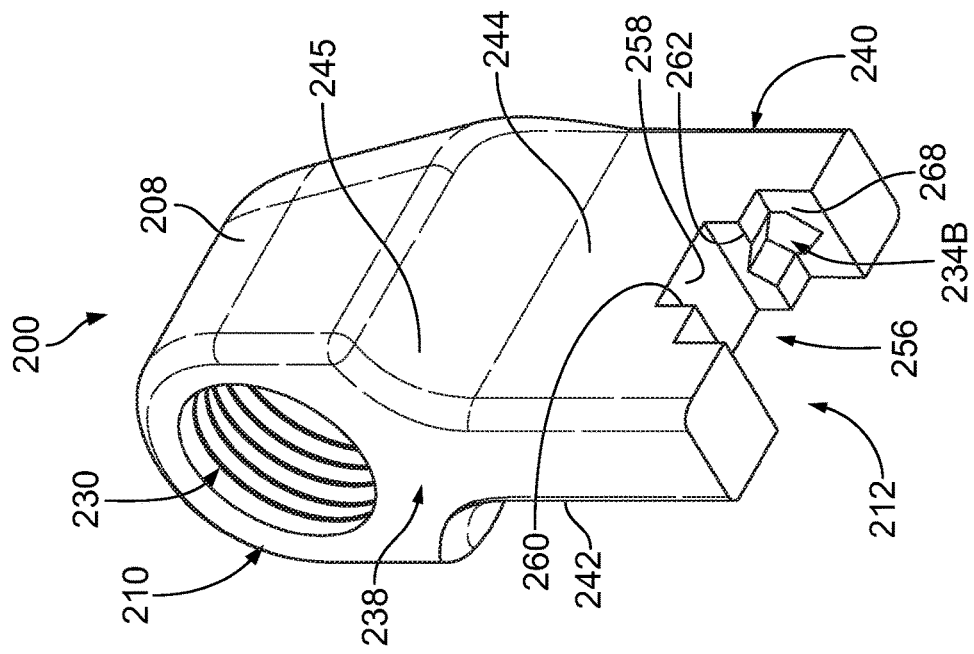
FIG. 12 is an end perspective view of the panel applicator nozzle shown in FIG. 9.
Figure 11:
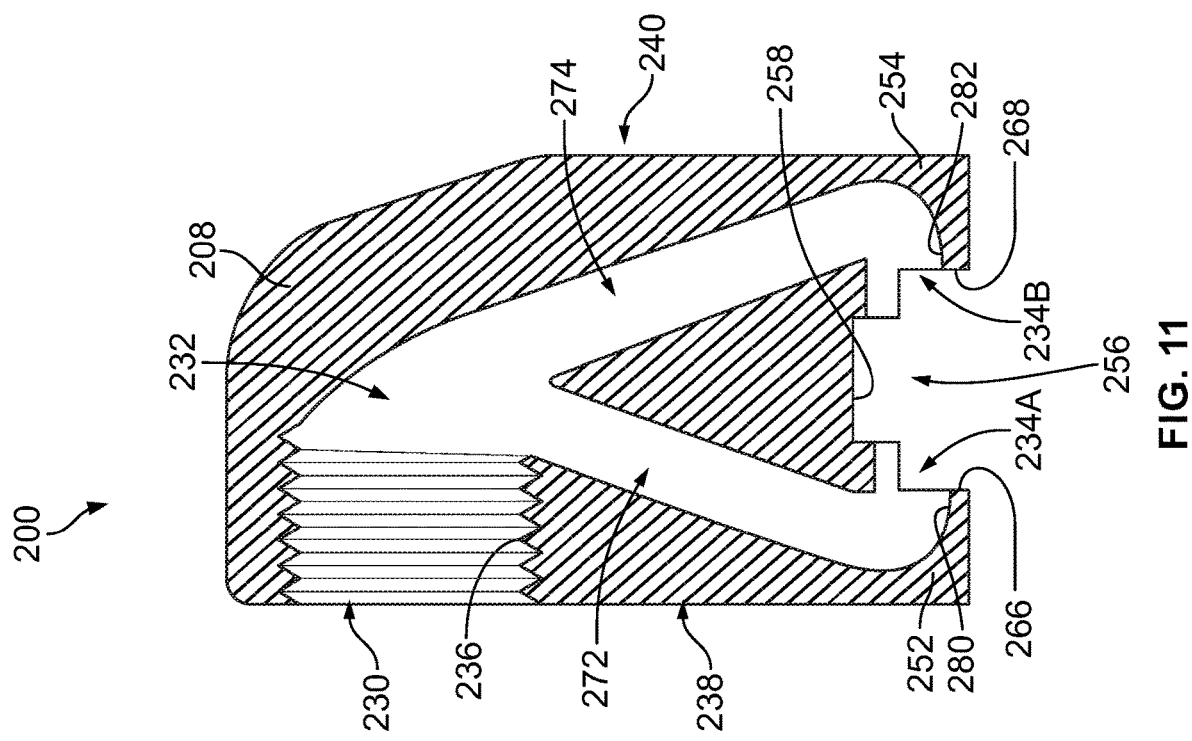
FIG. 11 is a cross-sectional side view of the panel applicator nozzle shown in FIG. 9.

FIGS. 9-12 illustrate various views of the panel applicator nozzle 200 shown in FIG. 8. For example, FIG. 9 is a top perspective view of the applicator nozzle 200. FIG. 10 is a side view of the applicator nozzle 200. FIG. 11 is a cross-sectional side view of the applicator nozzle 200. FIG. 12 is an end perspective view of the applicator nozzle 200.

The body 208 of the applicator nozzle 200 has a height or length along the longitudinal axis 190, a width along the lateral axis 191, and a depth along the depth axis 192. The depth of the body 208 extends from a first side 242 (shown in FIGS. 9 and 10) to a second side 244 (shown in FIG. 12) opposite the first side 242. The width of the body 208 extends from a first end 238 to a second end 240 opposite the first end 238. In the illustrated embodiment, the height of the body 208 extends from the dispensing end 212 to a top 250 opposite the dispensing end 212, and the mounting end 210 is located along the first end 238 of the body 208 proximate to the top 250. In an alternative embodiment, the mounting end 210 may be opposite the dispensing end 212. The mounting end 210 defines an inlet 230 to a channel 232 through the body 208. The channel 232 extends from the inlet 230 to multiple outlets 234A, 234B at the dispensing end 212. The body 208 may include internal helical threads 236 at the inlet 230 for releasably coupling to complementary threads of the hose or tube 214, shown in FIG. 8, which supplies the sealant 106 to the applicator nozzle 200. In an alternative embodiment, the body 208 may have exterior threads that are outside of the channel 232 and/or may have another coupling mechanism, such as a bayonet coupler, for connecting to the hose 214. The sealant 106 enters the channel 232 through the inlet 230 and exits through the outlets 234A, 234B.

As shown in FIGS. 9 and 12, the body 208 is contoured such that the body 208 is thicker along the depth axis 192 (between the first and second sides 242, 244) at the mounting end 210 than at the dispensing end 212. For example, the body 208 includes a tapered segment 245 along the height. The contoured shape of the body 208 may provide an ergonomic handle for an operator holding the applicator nozzle 200. Optionally, the width of the body 208 may be relatively uniform or constant along the height.

The body 208 includes a first arm 252 (e.g., projection) and a second arm 254 at the dispensing end 212. The arms 252, 254 are spaced apart along the width. A nozzle guide slot 256 is located between the first and second arms 252, 254. The nozzle guide slot 256 is sized and shaped to straddle the edge 201 of the panel 202. As shown in FIGS. 10 through 12, the nozzle guide slot 256 includes a base surface 258, a first track surface 260, and a second track surface 262. The base surface 258 is between the first and second track surfaces 260, 262, which extend from opposite ends or edges of the base surface 258 in a common direction toward the dispensing end 212. The base surface 258 is configured to contact the edge 201 of the panel 202, as shown in FIG. 10. The first track surface 260 is configured to contact (e.g., abut against) the first side 203 of the panel 202, and the second track surface 262 contacts the second side 204 of the panel 202. The width of the base surface 258 may be designed to be slightly larger (e.g., by 0.25 mm, 0.5 mm, 1 mm, or the like) than the width or thickness of the edge 201 to receive the edge 201 into the nozzle guide slot 256 and be able to move the applicator nozzle 200 along the length of the edge 201 without excessive obstruction or friction. The base surface 258 represents a contact surface or runner that slides along the edge 201 of the panel 202 as the applicator nozzle 200 is moved. The body 208 is configured to be moved along a length of the edge 201 of the panel 202 with the base surface 258 in sustained physical contact with the edge 201 such that either the first side 242 or the second side 244 of the body 208 faces in the direction of movement. Unlike the slot applicator nozzle 100, the arms 252, 254 at the dispensing end 212 optionally do not directly contact the work object (e.g., the panel 202).

In the illustrated embodiment, the nozzle guide slot 256 is spaced apart from respective inner surfaces 266, 268 of the first and second arms 252, 254 along the width. The inner surfaces 266, 268 face toward each other. The first track surface 260 is stepped apart from the inner surface 266 of the first arm 252, and the second track surface 260 is stepped apart from the inner surface 268 of the second arm 254. When the panel 202 is received into the nozzle guide slot 256, the inner surfaces 266, 268 of the first and second arms 252, 254 are spaced apart from the first and second sides 203, 204, respectively, of the panel 202 by clearance gaps 270.

Referring now to the cross-sectional view shown in FIG. 11, the channel 232 through the body 208 includes a first passageway 272 and a second passageway 274 fluidly connected to the inlet 230. In the illustrated embodiment, the passageways 272, 274 diverge from the inlet 230 and extend around the nozzle guide slot 256. For example, the first passageway 272 extends through the first arm 252, and the second passageway 274 extends through the second arm 254. The first passageway 272 is fluidly connected to a first outlet 234A along the inner surface 266 of the first arm 252. The second passageway 274 is fluidly connected to a second outlet 234B along the inner surface 268 of the second arm 254. The channel 232 receives the sealant 106 through the inlet 230 and dispenses the sealant 106 from the first and second outlets 234A, 234B onto the first and second sides 203, 204, respectively, of the panel 202. The sealant 106 is emitted into the clearance gaps 270 between the inner surfaces 266, 268 of the arms 252, 254 and the panel 202. As the panel applicator nozzle 200 is moved along the length of the edge 201, the sealant 106 emitted into the clearance gaps 270 defines the two beads 205, 206 shown in FIG. 8.

In an embodiment, the outlets 234A, 234B are spaced apart from the base surface 258. For example, the base surface 258 of the nozzle guide slot 256 may be at least slightly recessed relative to the outlets 234A, 234B along the height of the body 208 (e.g., the longitudinal axis 190). As a result, the edge 201 of the panel 202, which abuts (in physical contact) the base surface 258, does not receive the emitted sealant 106. Rather, the sealant 106 is dispensed onto the first and second sides 203, 204 of the panel 202 proximate to the edge 201. Optionally, respective end segments 280, 282 of the first and second passageways 272, 274, which extend from the outlets 234A, 234B, are oriented transverse to the first and second sides 203, 204 of the panel 202. For example, the end segments 280, 282 may be orthogonal to the first and second sides 203, 204 of the panel 202 in order to deposit sealant 106 in a direction that is normal to the sides 203, 204.

FIG. 13 is a side view of the applicator nozzle 200 according to an alternative embodiment. The arms 252, 254 in the illustrated embodiment project farther than the arms 252, 254 in FIGS. 8 through 12. Furthermore, each of the arms 252, 254 has a tab 300 that projects inward from the respective arm 252, 254 at the dispensing end 212. The tabs 300 provide control over the formation of the beads 205, 206 of sealant 106 shown in FIG. 8 by providing barrier surfaces 304 opposite the nozzle guide slot 256. Therefore, the emitted sealant 106 is confined within the clearance spaces 306 shown in FIG. 13. The tabs 300 are spaced apart from each other along the width to accommodate the width or thickness of the panel 202 between the tabs 300.

Figure 16:
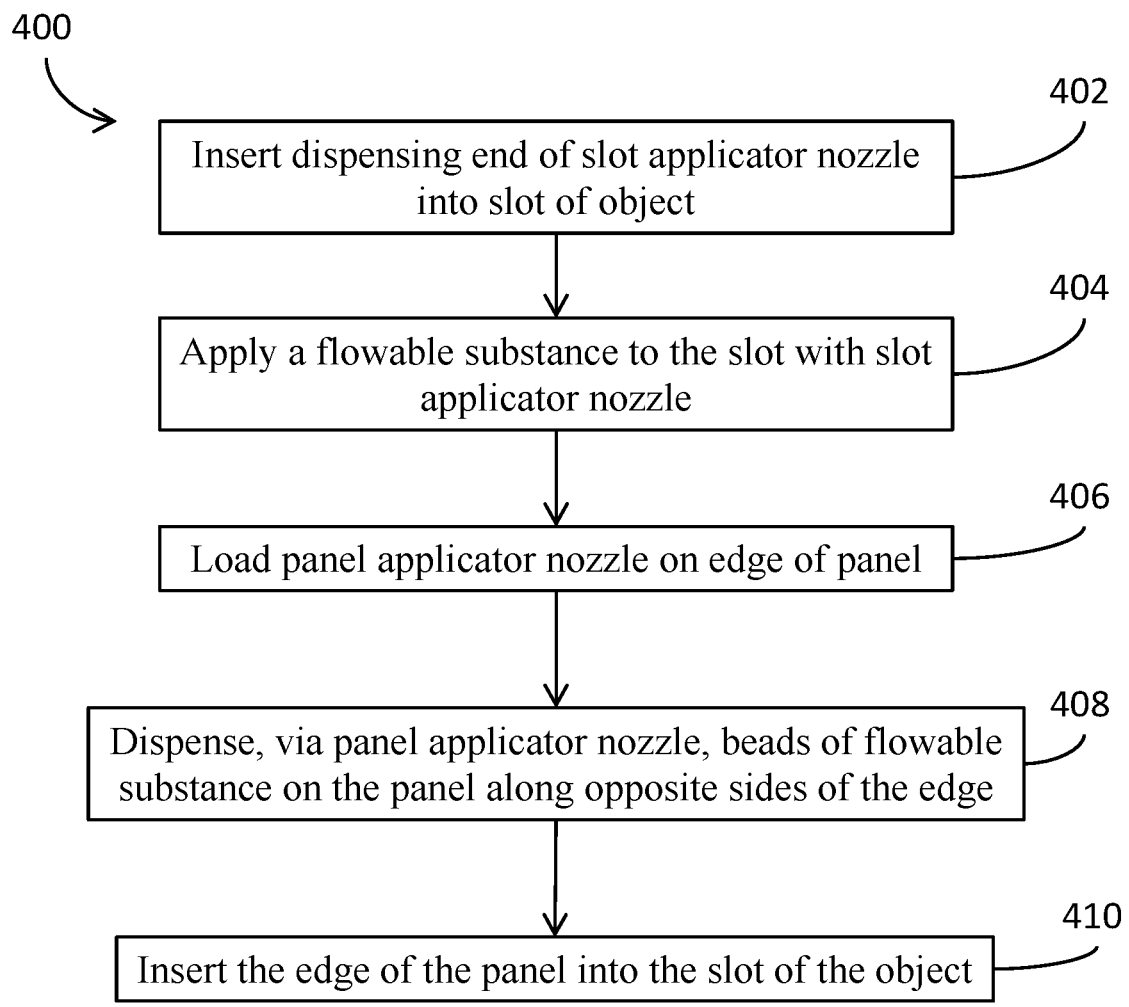
FIG. 16 is a flow chart for a method of sealing a panel to an object according to an embodiment.

FIG. 14 illustrates the panel 202 poised for insertion into the slot 102 of the object 104 according to an embodiment. The panel 202 has the two beads 205, 206 of sealant 106 along the first and second sides 203, 204 thereof. The two beads 205, 206 are applied to the panel 202 via the panel applicator nozzle 200. The slot 102 contains the bead 116 of sealant 106 dispensed by the slot applicator nozzle 100. FIG. 15 illustrates the panel 202 within the slot 102 of the object 104. FIG. 16 is a flow chart of a method 400 of sealing a panel to an object according to an embodiment. The method 400 is described with reference to FIGS. 14 and 15. For example, the method 400 refers to the slot applicator nozzle 100 shown and described with reference to FIGS. 1 through 7 and the panel application nozzle 200 shown and described with reference to FIGS. 8 through 13.

At 402, the dispensing end 112 of the slot applicator nozzle 100 is inserted into the slot 102 of the object 104. At 404, the slot applicator nozzle 100 applies a flowable substance to the slot 102. The flowable substance may be a sealant 106, and is referred to herein as a sealant, but other types of flowable substances can be used in other embodiments. The applying includes moving the body 108 of the slow applicator nozzle 100 along the slot 102 in an application direction 146. The outlet 134 of the slot applicator nozzle 100 emits the sealant 106 rearward of the trailing contact surface 162 onto the bottom surface 166 of the slot 102 as the body 108 is moved in the application direction 146 to provide the bead 116.

At 406, the panel applicator nozzle 200 is loaded on the edge 201 of the panel 202. The nozzle guide slot 256 of the panel applicator nozzle 200 has a base surface 258 shaped to engage the edge 201 of the panel 202 while the first and second arms 252, 254 straddle the panel 202. At 408, two beads 205, 206 of the sealant 106 are dispensed via the panel applicator nozzle 200 on the panel 202 along opposite sides of the edge 201. The beads 205, 206 are proximate to the edge 201, but no sealant is shown deposited on the edge 201 of the panel 202, as shown in FIG. 14. The dispensing includes moving the panel applicator nozzle 200 along the edge 201 of the panel 202 in an application direction while emitting the sealant.

At 410, the edge 201 of the panel 202 is inserted into the slot 102 with the sealant 106 present in the slot 102 and present on the panel 202. The beads 116, 205, 206 of the sealant 106 get compressed between the panel 202 and the inner walls of the slot 102. For example, the sealant 106 along the bottom surface 166 is compressed between the edge 201 and the bottom surface 166; the sealant 106 along the first side 203 of the panel 202 is compressed between the first side 203 and a first side wall 402 of the slot 102; and the sealant 106 along the second side 204 of the panel 202 is compressed between the second side 204 and a second side wall 404 of the slot 102 opposite the first side wall 402. The sealant 106 within the different beads 116, 205, 206 may merge to form an integrated sealant mass 408 that fills at least a majority of the volume of the slot 102 around the panel 202. The sealant mass 408 within the slot 102 seals the panel 202 to the object 104. Optionally, another process may occur, such as heat treatment, to cure and/or solidify the sealant mass 408.

In an embodiment, a slot applicator nozzle is provided that includes a body with a dispensing end sized to fit within a slot of an object. The dispensing end extends from a front end of the body to a rear end of the body. The body defines a channel therethrough with an outlet at the dispensing end. The dispensing end includes a leading contact surface and a trailing contact surface separated from each other by a gap. Both the leading and trailing contact surfaces are configured to contact a bottom surface of the slot as the body is moved along the slot in an application direction. The trailing contact surface is disposed between the leading contact surface and the rear end. The outlet of the channel is configured to emit a flowable substance rearward of the trailing contact surface onto the bottom surface of the slot as the body is moved in the application direction.

Optionally, the dispensing end also includes a leveling surface disposed rearward of the trailing contact surface such that the trailing contact surface is between the leveling surface and the leading contact surface. The leveling surface is configured to restrict a height of the flowable substance that is deposited onto the bottom surface of the slot as the body is moved in the application direction. Optionally, the leveling surface is recessed a designated distance from the trailing contact surface along a height of the body. Optionally, the outlet is located between the trailing contact surface and the leveling surface along the dispensing end.

Optionally, the body also includes a mounting end that defines an inlet of the channel. The flowable substance enters the channel through the inlet and exits through the outlet at the dispensing end. The mounting end is opposite the dispensing end along a height of the body. Optionally, the leading contact surface is recessed relative to the trailing contact surface along the height of the body such that, when both the leading contact surface and the trailing contact surface are in contact with the bottom surface of the slot, the body leans such that the mounting end leads the dispensing end as the body is moved in the application direction. Optionally, the dispensing end is longer than the mounting end from the front end to the rear end and thinner than the mounting end from a first side of the body to an opposite, second side of the body. Optionally, the body includes internal helical threads at the inlet.

Optionally, the object that defines the slot is a seal for a gear case assembly, and the flowable substance within the slot is a sealant configured to seal against an axle bore of the gear case assembly when the axle bore is inserted into the slot.

Optionally, the leading contact surface and the trailing contact surface have shapes that complement a curve along the bottom surface of the slot.

In an embodiment, a system is provided that includes a slot applicator nozzle, a seal for a gear case assembly, and a flowable substance. The seal defines a slot. The slot applicant nozzle dispenses the flowable substance into the slot. The flowable substance includes a sealant configured to seal against an axle bore of the gear case assembly when the axle bore is inserted into the slot.

In an embodiment, a method is provided that includes using a slot applicator nozzle to apply a flowable substance into a slot. Optionally, the slot is defined by a seal for a gear case assembly, and the flowable substance is a sealant configured to seal against an axle bore of the gear case assembly when the axle bore is inserted into the slot. For example, the method may include sealing, via the sealant, against an axle bore of the gear case assembly when the axle bore is inserted into the slot.

In an embodiment, a method is provided that includes inserting a dispensing end of a slot applicator nozzle into a slot of an object. The dispensing end includes a leading contact surface and a trailing contact surface separated from each other by a gap and configured to contact a bottom surface of the slot. The method also includes applying, via the slot applicator nozzle, a flowable substance to the slot. The slot applicator nozzle includes a body that defines a channel therethrough with an outlet at the dispensing end. The applying includes moving the body along the slot in an application direction. The trailing contact surface is disposed behind the leading contact surface relative to the application direction. The outlet emits the flowable substance rearward of the trailing contact surface onto the bottom surface of the slot as the body is moved in the application direction.

Optionally, the slot is defined by a seal for a gear case assembly and the flowable substance is a sealant. The method may also include inserting an axle bore of the gear case assembly into the slot with the sealant present in the slot.

Optionally, the applying includes restricting a height of the flowable substance that is deposited onto the bottom surface of the slot as the body is moved in the application direction via a leveling surface at the dispensing end of the slot applicator nozzle. The leveling surface is disposed behind the trailing contact surface relative to the application direction. Optionally, the outlet of the slot applicator nozzle is located between the trailing contact surface and the leveling surface along the dispensing end.

In an embodiment, a panel applicator nozzle is provided that includes a body with a dispensing end and a mounting end. The dispensing end defines a nozzle guide slot disposed between a first arm and a second arm of the body. The nozzle guide slot has a base surface shaped to engage an edge of a panel while the first and second arms straddle the panel. The body defines an inlet at the mounting end and one or more passageways fluidly connected to the inlet. The one or more passageways extend to a first outlet along an inner surface of the first arm and to a second outlet along an inner surface of the second arm. The inner surfaces of the first and second arms face toward each other. The body is configured to receive a flowable substance through the inlet and dispense the flowable substance from the first and second outlets onto opposite first and second sides, respectively, of the panel.

Optionally, the nozzle guide slot includes a first track surface and a second track surface extending from opposite ends of the base surface. The first track surface is configured to contact the first side of the panel and the second track surface is configured to contact the second side of the panel. Optionally, the first and second track surfaces are located between the inner surface of the first arm and the inner surface of the second arm along a width of the dispensing end. The first and second track surfaces may be spaced apart from the inner surfaces of the first and second arms. Optionally, the inner surfaces of the first and second arms are configured to be spaced apart from the first and second sides, respectively, of the panel by clearance gaps. The first and second outlets dispense the flowable substance across the clearance gaps onto the respective first and second sides of the panel.

Optionally, the first and second outlets are spaced apart from the base surface of the nozzle guide slot along a height of the body such that the flowable substance is not dispensed onto the edge of the panel that contacts the base surface. Optionally, the body has a first side and a second side opposite the first side. The body is configured to be moved along a length of the edge of the panel with the base surface in sustained engagement with the edge such that one of the first side or the second side faces in a direction of movement. Optionally, the body includes internal helical threads at the inlet.

Optionally, the one or more passageways includes a first passageway and a second passageway that diverge from the inlet within the body. The first passageway extends to the first outlet, and the second passageway extends to the second outlet. Optionally, each of the first and second passageways has a respective end segment extending from the respective first or second outlet. Each of the end segments is oriented transverse to the first and second sides of the panel.

Optionally, each of the first and second arms of the body includes a respective tab projecting toward the panel. The tabs are configured to restrict a width of the flowable substance that is deposited onto the first and second sides of the panel.

In an embodiment, a method is provided that includes using a panel applicator nozzle as described with reference to FIGS. 8 through 13 to apply a flowable substance to a panel. The panel may be subsequently inserted into a slot, such as a slot in a seal, to enable the flowable substance to fill space between the panel and walls that define the slot. Optionally, the panel is a component of a gear case assembly.

In an embodiment, a system is provided for attaching a panel in a slot defined by an object. The system includes a panel applicator nozzle as described with reference to FIGS. 1 through 7 and a slot applicator nozzle as described with reference to FIGS. 8 through 13.

It is to be understood that the above description is intended to be illustrative, and not restrictive. For example, the above-described embodiments (and/or aspects thereof) may be used in combination with each other. In addition, many modifications may be made to adapt a particular situation or material to the teachings without departing from its scope. While the dimensions and types of materials described herein are intended to define the parameters, they are by no means limiting and are exemplary embodiments. Many other embodiments will be apparent to one of ordinary skill in the art upon reviewing the above description. As used herein, the terms "including," "includes," and "in which" are used as the plain-English equivalents of the respective terms "comprising," "comprises," and "wherein." Moreover, the terms "first," "second," and "third," etc. are used merely as labels, and are not intended to impose numerical requirements on their objects.

This written description uses examples to disclose several embodiments, and also to enable any person skilled in the art to practice the embodiments, including making and using any devices or systems and performing any incorporated methods. The patentable scope may include other examples that occur to one of ordinary skill in the art. Such other examples are intended to be within the scope of the invention if they have structural elements that do not differ from the literal language herein, or if they include equivalent structural elements with insubstantial differences from the literal languages used herein.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle system or consist, without departing from the spirit and scope of the embodiments described herein, it is intended that all of the subject matter of the above description or shown in the accompanying drawings shall be interpreted merely as examples illustrating the inventive subject matter herein and shall not be construed as limiting.

What is claimed is:

1. A slot applicator nozzle comprising:
   a nozzle body that extends a height from a mounting end of the nozzle body to a dispensing end of the nozzle body, the dispensing end sized to fit within a slot of an object, the nozzle body defining a channel therethrough with an outlet at the dispensing end,
   the dispensing end of the nozzle body including a leading contact surface and a trailing contact surface separated from each other by a gap, both the leading and trailing contact surfaces configured to contact a bottom surface of the slot as the nozzle body is moved along the slot in an application direction with the trailing contact surface trailing behind the leading contact surface, the dispensing end of the nozzle body including a leveling surface disposed behind the trailing contact surface such that the trailing contact surface is between the leveling surface and the leading contact surface, the leveling surface recessed from the trailing contact surface along the height of the nozzle body such that at least a portion of the leveling surface is disposed closer to the mounting end than a proximity of the trailing contact surface to the mounting end,
   wherein the outlet of the channel is located between the trailing contact surface and the leveling surface along the dispensing end and is configured to emit a flowable substance rearward of the trailing contact surface onto the bottom surface of the slot as the nozzle body is moved in the application direction, the outlet being stepped such that a front edge of the outlet is defined by the trailing contact surface and a rear edge of the outlet is defined by the leveling surface, the leveling surface configured to control a height of a bead of the flowable substance that is deposited onto the bottom surface of the slot as the nozzle body moves in the application direction with both the leading and trailing contact surfaces in contact with the bottom surface of the slot.

2. The slot applicator nozzle of claim 1, wherein the mounting end of the nozzle body defines an inlet of the channel, and the flowable substance is configured to enter the channel through the inlet and exit through the outlet at the dispensing end.

3. The slot applicator nozzle of claim 2, wherein the height of the nozzle body extends along a longitudinal axis from the dispensing end to the mounting end, and the leveling surface has an obtuse orientation relative to the height of the nozzle body.

4. The slot applicator nozzle of claim 1, wherein the leading contact surface is recessed relative to the trailing contact surface along the height of the nozzle body such that, when both the leading contact surface and the trailing contact surface are in contact with the bottom surface of the slot, the nozzle body leans such that the mounting end leads the dispensing end as the nozzle body is moved in the application direction.

5. The slot applicator nozzle of claim 4, wherein the nozzle body has a length from a front end of the nozzle body to a rear end of the nozzle body and a depth from a first side of the nozzle body to an opposite, second side of the nozzle body, wherein the dispensing end of the nozzle body is longer than the mounting end of the nozzle body along the length and thinner than the mounting end along the depth.

6. The slot applicator nozzle of claim 1, wherein the leading contact surface and the trailing contact surface are angled relative to one another to complement the bottom surface of the slot having a convex curvature relative to the nozzle body.

7. The slot applicator nozzle of claim 1, wherein the leveling surface is planar.

8. The slot applicator nozzle of claim 1, wherein the outlet has an orientation that is transverse to the trailing contact surface to emit the bead of the flowable substance rearward of the trailing contact surface.

9. The slot applicator nozzle of claim 1, wherein the nozzle body includes side walls that define side edges of the outlet, wherein the side walls extend from the trailing contact surface to the leveling surface and control a width of the bead of the flowable substance that is deposited onto the bottom surface of the slot.

10. A method comprising:
    inserting a dispensing end of a nozzle body of a slot applicator nozzle into a slot of an object, the dispensing end including a leading contact surface and a trailing contact surface separated from each other by a gap and configured to contact a bottom surface of the slot;
    applying, via the nozzle body, a flowable substance to the slot, wherein the nozzle body extends a height from a mounting end of the nozzle body to the dispensing end of the nozzle body, and defines a channel therethrough along the height with an outlet at the dispensing end, wherein the applying includes moving the nozzle body along the slot in an application direction, wherein the trailing contact surface is disposed behind the leading contact surface relative to the application direction, and the outlet emits the flowable substance rearward of the trailing contact surface onto the bottom surface of the slot as the nozzle body is moved in the application direction; and restricting a height of a bead of the flowable substance that is deposited onto the bottom surface of the slot as the nozzle body is moved in the application direction via a leveling surface at the dispensing end of the nozzle body, the leveling surface disposed behind the trailing contact surface relative to the application direction and recessed from the trailing contact surface along the height of the nozzle body such that at least a portion of the leveling surface is disposed closer to the mounting end than a proximity of the trailing contact surface to the mounting end, wherein the outlet is located between the trailing contact surface and the leveling surface along the dispensing end and is stepped such that a front edge of the outlet is defined by the trailing contact surface and a rear edge of the outlet is defined by the leveling surface.

11. The method of claim 10, wherein the slot is defined by a seal for a gear case assembly and the flowable substance is a sealant, the method further comprises inserting an axle bore of the gear case assembly into the slot with the sealant present in the slot.

12. A slot applicator nozzle comprising:
a nozzle body with a mounting end and a dispensing end opposite the mounting end, the dispensing end sized to fit within a slot of an object, the dispensing end extending from a front end of the nozzle body to a rear end of the nozzle body, the nozzle body defining a channel therethrough with an outlet at the dispensing end, wherein the dispensing end includes a leading contact surface and a trailing contact surface separated from each other by a gap, both the leading and trailing contact surfaces configured to contact a bottom surface of the slot as the nozzle body is moved along the slot in an application direction, the trailing contact surface disposed between the leading contact surface and the rear end of the nozzle body, wherein the outlet of the channel is configured to emit a flowable substance rearward of the trailing contact surface onto the bottom surface of the slot as the nozzle body is moved in the application direction, wherein the leading contact surface is recessed relative to the trailing contact surface along a height of the nozzle body such that, when both the leading contact surface and the trailing contact surface are in contact with the bottom surface of the slot, the nozzle body leans such that the mounting end leads the dispensing end as the nozzle body is moved in the application direction, and wherein the dispensing end also includes a leveling surface disposed rearward of the trailing contact surface and the outlet, and the leveling surface is recessed a distance from the trailing contact surface along the height of the nozzle body for controlling a height of a bead of the flowable substance deposited onto the bottom surface of the slot as the nozzle body moves, wherein the outlet is stepped such that a front edge of the outlet is defined by the trailing contact surface and a rear edge of the outlet is defined by the leveling surface.

13. The slot applicator nozzle of claim 12, wherein the mounting end defines an inlet of the channel, wherein the flowable substance enters the channel through the inlet and exits through the outlet at the dispensing end.

14. The slot applicator nozzle of claim 13, wherein the dispensing end is longer than the mounting end from the front end of the nozzle body to the rear end of the nozzle body and thinner than the mounting end from a first side of the nozzle body to an opposite, second side of the nozzle body.

15. The slot applicator nozzle of claim 12, wherein the leading contact surface and the trailing contact surface are angled relative to one another to complement the bottom surface of the slot having a convex curvature relative to the nozzle body.

16. The slot applicator nozzle of claim 12, wherein the height of the nozzle body extends along a longitudinal axis from the dispensing end to the mounting end, and the leveling surface has an obtuse orientation relative to the height of the nozzle body.

* * * * *